United States Patent
Nikaido et al.

[11] 3,857,071
[45] Dec. 24, 1974

[54] BONDING CIRCUIT FOR REDUCING SHEATH CURRENT OF POWER CABLE LINE

[75] Inventors: Teruji Nikaido; Kaoru Haga, both of Tokyo; Norio Sugiyama, Mayama-machi; Yasutaka Fujiwara, Yokohama, all of Japan

[73] Assignees: Tokyo Denryoku Kabushiki Kaisha, Tokyo; Showa Densen Denran Kabushiki Kabushi, Kanagawa-ken, both of, Japan

[22] Filed: June 1, 1973

[21] Appl. No.: 366,165

[30] Foreign Application Priority Data
June 16, 1972 Japan.............................. 47-60658

[52] U.S. Cl..................... 317/44, 317/61.5, 174/32, 307/147
[51] Int. Cl. ........................................... H02h 7/22
[58] Field of Search ............ 317/44, 45, 11 C, 11 E, 317/61.5, 27, 49, 50; 174/32, 85, 11 R, 99; 307/93, 92; 333/12; 307/147

[56] References Cited
UNITED STATES PATENTS

| | | |
|---|---|---|
| 1,512,443 | 10/1924 | Atkinson............................... 317/44 |
| 1,512,444 | 10/1924 | Atkinson............................... 317/44 |
| 1,603,875 | 10/1926 | Shanklin .............................. 317/44 |
| 2,018,241 | 10/1935 | Viele..................................... 317/44 |
| 3,515,947 | 6/1970 | Stetson ................................ 317/61 |

*Primary Examiner*—James D. Trammell
*Assistant Examiner*—Patrick R. Salce
*Attorney, Agent, or Firm*—Fred Philp, W. Robert Baylor

[57] ABSTRACT

In a three phase line of a single core power cable having a metal sheath, the sheath circuit current arising in each of the metal sheaths is reduced by cross-bonding the sheaths of each phase cable. At the front and back of an insulation joint box in the circuit. In order to further reduce the sheath current, saturable reactors are connected in series to the respective cross-bonding wires. As the surge impedance of the cross bonding point is increased by the connection of the saturable reactors, both sides of the insulation joint box are connected by means of a protection device having nonlinear characteristics simultaneous with the entering of the surge voltage, whereby the dielectric break-down of the insulation tube of the insulation joint box or the anti-corrosion layer of the cable can be prevented.

3 Claims, 7 Drawing Figures

BONDING CIRCUIT FOR REDUCING SHEATH CURRENT OF POWER CABLE LINE

BACKGROUND OF THE INVENTION

The present invention relates to an improved sheath current circuit that is utilized with power cable lines and particularly to a bonding circuit that is adapted to reduce the sheath current in power cable lines.

The cross-bonding of conventional circuit types has been widely known which allows three phase lines of the single core power cables having metal sheaths to reduce the circulating current on the sheath circuitry. Two insulation joint boxes are serially connected in each cable line section formed by two normal joint boxes which are grounded from each phase cable. Other phase cable sheaths are successively cross-connected to each other to the bonding wire at the front and back of each insulation joint box. Thus, the current induced in the sheath of the each phase cable is designed to reduce each other.

In a cross-bonding circuit, unless distances between each joint box (for example, between two insulation joint boxes or between the insulation joint box and the normal joint box) are entirely equal, and also unless relative arrangements of each phase cables between each of the joint boxes are equal, a desired effect cannot be expected. In the actual cable lines, due to topography or other conditions, a result, even in cable lines that employ cross-bonding circuitry, there is the inconvenience and danger that considerable large sheath current will flow therein.

Further, the so-called series-impedance bonding circuit is widely known in the prior art. Other bonding circuits allow the cables to be connected in each insulation joint box. The section between sheaths of the same phase cable at the front and back of each joint box is designed to connect through each impedance. Thereby the mid-point of each impedance element is grounded. This type of bonding circuit has eliminated the disadvantage of the above cross-bonding. However, the impedance element that is disposed in each joint box is a costly item. Further, this arrangement inconveniently requires the use of large impedance elements in order to keep the sheath circuit current small in value.

The present invention provides a new and improved circuit in which a saturable reactor having a saturation characteristic that is adapted for use with a fault current or a large current, is inserted in each cross-bonding wire. The newly developed circuit is capable of reducing the sheath circulating current irrespective of the unequal distance between the joint boxes or the unequal arrangements of interrelation between each phase cables. Consequently, this involves relatively less cost. However, the new and improved circuit results in a high impedance for the entering surge voltage of the saturable reactor which is inserted to the cross bonding wire, thereby causing the surge voltage between the sheath and the ground, at the connecting point of the saturable reactor, to rise nearly twice that of the voltage in contrast to a conventional cross-bonding circuit. Consequently this tends to cause dielectric break-down of the layers or of the insulation tube in the insulation joint box.

SUMMARY OF THE INVENTION

It is therefore, an object of the present invention to connect the saturable reactor to each cross-bonding wire in series to reduce the circulating current in the sheath circuit, and to connect through a protective device having nonlinear resistance characteristic to both sides of the connecting point of the saturable reactor to prevent the dielectric break-down in the anti-corrosion layers and simultaneously the entering of the surge voltage.

A further object of the invention is to employ the above protective device that is combined with the discharge gap to develop a characteristic of dielectric break-down of the anti-corrosion layers in the dynamic current that is flowing after the surge voltage by-passing, thereby facilitating the techniques of the maintenance or check-up of the cable line by the ability to measure the insulation resistance.

In essence, the circuit of the present invention is for reducing sheath current in an alternating current three phase line of a single core power cable in which anti-corrosive layers cover the outer surface of the metal sheath, comprising first normal joint box means in each of the phase lines; first wire means connecting the boxes in the respective lines and being grounded; each of the phase lines including first insulated joint box means having back and front contact points, the first insulated joint box means being serially connected via said back contact point to the first normal joint box means, a protective device connected in parallel via the back and front contact points with the first insulated joint box means, second insulated joint box means serially connected to said parallel combination via the front contact point; saturable reactor means coupled between the back contact point of one line with the front contact point of another line, respectively, each of the saturable reactor means reducing the current in the phase lines; each of the phase lines including second insulated joint box means having rear and forward contact points; second wire means connecting the rear contact of the second insulated joint box means of one line with the forward contact point of the second insulated joint box means of another line, respectively; each of the phase lines including second normal joint box means serially connected via the forward contact point to the second insulated joint box means; third wire means connecting the second normal joint box means in the respective lines and being grounded; each of said protective devices including a first set of parallel connected nonlinear resistance elements for operatively protecting one part of the first insulated joint box means, and being grounded through a discharging gap, and a second set of parallel connected nonlinear resistance elements for operatively protecting another part of the first insulated joint box means and being grounded through a discharging gap, said protective devices operatively preventing the dielectric break-down in the anti-corrosive layers and simultaneously the entering of surge voltages.

DESCRIPTION OF THE PREFERRED EMBODIMENT

Figure 1:
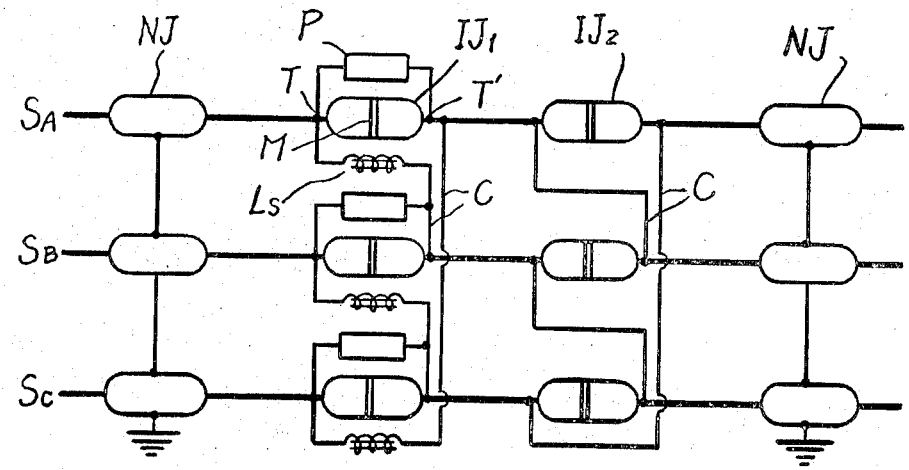
FIG. 1 is a circuit diagram illustrating an embodiment according to the present invention.

A phase, B phase and C phase metal sheath single core power cables $S_A$, $S_B$, $S_C$ as shown in FIG. 1 are respectively connected through normal joint boxes NJ and insulation joint boxes I $J_1$, I $J_2$. Each of these cables is, for example, provided with anti-corrosion layers of rubber or polyethylene on the outer face of a metal sheath of corrugated aluminum sheath or the like. It is provided that the normal joint box be actuated to envelope or enclose air-tightly the cable conductor and the insulated joint, and to connect these, in a conductive manner, between the metal sheaths of the cable inserted and secured in the end sleeves. It is further provided that the insulation joint box be constructed by placing an insulation tube M to divide the box into two parts, that the longitudinally divided conductor-pipes which form the joint box and that the metal sheaths of cables that are adapted to be inserted in the ends sleeves, be not electrically conductive to each other.

These joint boxes are arranged in a manner that two insulation joint boxes I $J_1$, I $J_2$ which are serially connected follow the normal joint box N J in the circuit, so that the same order is repeated to place two insulation joint boxes between two normal joint boxes and being grounded respectively.

The insulation joint box I $J_2$ has a cross-bonding, at its front and back, of multi phase cable sheaths themselves through a bonding wire C. While the insulation joint box I $J_1$, having a cross-connection through the bonding wire, allows a saturable reactor $L_s$ to connect in series to its bonding wires respectively. Further, both sides of each insulation joint box at connecting points of these reactors are connected through a protective device P respectively.

Figure 2:
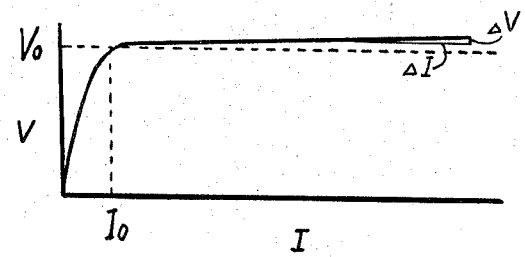
FIG. 2 is a graph illustrating an example of a V-I characteristic of a saturable reactor according to the present invention.

The characteristic of the saturable reactor $L_s$ as shown in FIG. 2 requires an iron-core reactor having an extreme saturation characteristic which is shown by a voltage rise to be reduced to a small value for a large fault current (e.g., hundreds to tens thousands amperes) as the voltage V rises almost linearly and as high as 0 to 10 V of Voltage V (hereby $V_0 = 10V$) for the current I of 0 – 10 amp. (hereby $I_0 = 10$ amp.). It is desirable that this reactor has a value of 0.1 to 5.0 ohm of impedance before saturation ($V_0/I_0$), preferably within 0.5 to 2.0 ohm, and less than 0.01 ohm of impedance after saturation (impedance mentioned herein denotes $\Delta V/\Delta I$ after complete saturation), preferably less than 0.001 ohm.

A single nonlinear resistance element R or a resistance element combination with a discharge gap thereof is for use in the protective device P.

As in the case of a characteristic element of a an arrester, the nonlinear resistance element R shows the largest resistance value before the input voltage reaches the discharge voltage, and requires a characteristic whereby the inter-electrode voltage is reduced to a definite limited voltage during discharge. A nonlinear resistance element having an arc blow structure is preperably for use in the discharge gap.

Figure 3A:
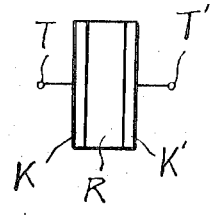
FIGS. 3A–3D are circuit diagrams illustrating protective devices according to the present invention.
Figure 3B:
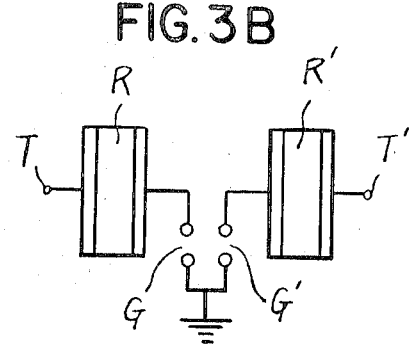
Figure 3C:
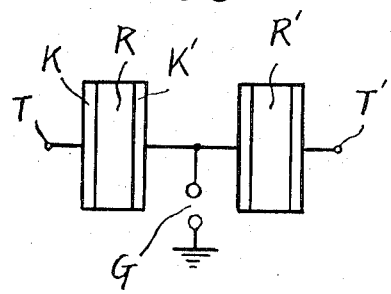
Figure 3D:
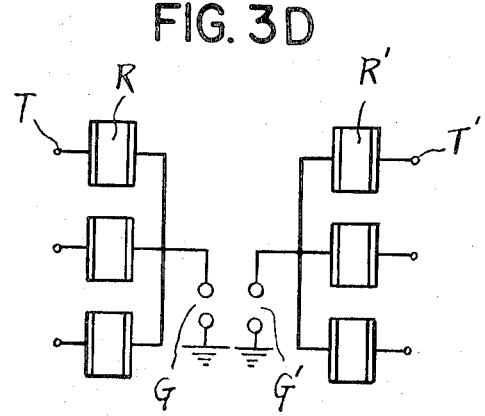

For use in the protective device as illustrated in FIG. 3A are the types which have electrodes K, K' on the both sides of the nonlinear resistance element R and are adapted to connect terminals T, T' to the both sides of the insulation joint boxes I J. FIG. 3B shows the types which connect two nonlinear resistance elements to two discharge gaps G, G' between the terminals T, T' to ground, usually the low voltage side of one of these gaps. FIG. 3C shows the types which allow the mid-point of the two nonlinear resistance elements R, R' to be connected in series to ground through the discharge gap G. These protective devices P are connected independently to each phase insulation joint box I J. As shown in FIG. 3D, one electrode K' of these nonlinear resistance elements which are for use in the left half of each of the phase insulation joint boxes I J may be connected to ground through the discharge gap G. The three nonlinear resistance element R' which are for use in the right half thereof are adapted in the same manner. Further, the discharge gap G' may be used in the combination.

The discharge starting voltage or the limited voltage of nonlinear resistance element in these protective devices that is to be selected depend on the rated value of the cable system. For example, in case of cable lines of the 154 KV class, the impulse discharge starting, voltage of the uppermost value is as high as 14 or the limited voltage is as high as 5.5 to 14 KV and the standard impulse current may be used.

The thus described circuit of the present invention is capable of reducing the circulating current that flows in the cable sheath.

Figure 4:
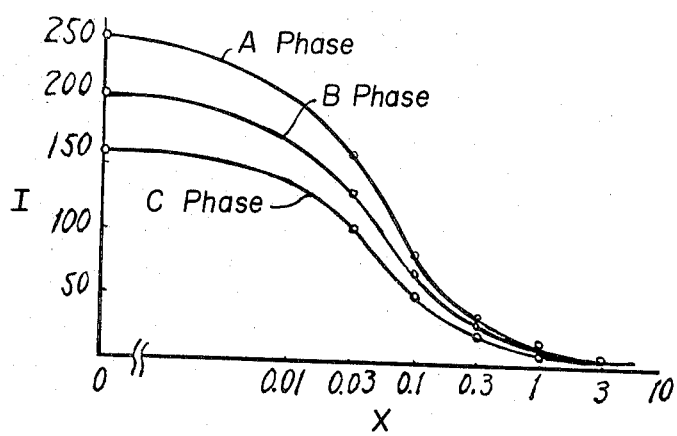
FIG. 4 is a graph of an example illustrating a relationship between the sheath current and the saturable reactor according to the circuitry of the present invention.

The cross-bonding circuit of the conventional type may require that a sheath circulating current of 160 to 250 amperes flows to a phase current of 480 amp. in the case of the multiple circuit having so large an unbalance current. However, the system of the present invention applicable for this line as shown in FIG. 4 is capable of reducing the sheath current as low as 20 to 30 amp. by inserting a reactance of 0.3 ohm. A further reduction to 3 amp. is obtained by inserting a reactance of 3.0 ohm.

Thus, the present invention enables the circulating current in the sheath circuit to be substantially reduced and thereby reduce the power loss that results from the sheath circuit current and the sheath heating.

Further, when large current, for example fault current is forced to flow in the sheath current, the reactor shows an extreme saturation characteristic, thereby allowing its impedance to be reduced to as low as the air-core inductance. Therefore, the reactor does not prevent the fault current from circulating through the sheath, and consequently limits the ground current to a value not to produce communication disturbances.

The nonlinear resistance element of the protective device is discharged and thereby acts as a by-pass for the surge voltage. Thereby the surge voltage reflects a little at the connecting point of the saturable reactor to keep the voltage from a large rise. Therefore the moved-in surge voltage prevents the cable anti-corrosion layers and insulation tube of the insulation joint box from an insulation break-down.

The discharge gap G is so effective for rapidly breaking the dynamic current after a surge by-passing that the bonding line of each protective device there is no requirement to remove when measuring the insulation resistance of the cable line.

Further, the bonding circuit of the present invention that is adapted to insert the saturable reactor in series into the bonding wire in the formed line and connect the protective device thereto enables the formed conventional cross bonding cable line to be improved under the bonding circuit of the present invention.

The conventional series impedance bonding requires the use of a large impedance element when attempting to keep the circulating current as large as that disclosed by the present invention. On the other hand, the voltage impressed in the reactor is, according to the present invention, nothing but the difference of the induced voltage in the each phase cable sheath (vector sum), so that the reactor may be small in size, and one to six reactors are sufficient for the cable line of the same length, thus advantageously reducing the expense. It is also desirable that the cable sheath voltage be kept about 50 V for safety. However, the present invention enables the impedance of the reactor to be reduced to as small as 0.1 to 3 ohm, being more advantageous than the series impedance type bonding circuit. In other words, the present invention allows the span length of the insulation to become fairly large when the sheath voltage is the same, thereby reducing the frequency of use of the insulation joint box.

Thus an example of inserting the reactor to one of the two insulation joint boxes mounted in the section formed by the two normal joint boxes has been given. Thus, it is possible to connect the saturable reactor and the protective device having nonlinear resistance characteristic to the contact point of the two insulation joint boxes. Further, it is possible to use other normal joint box (not grounded) in the above section.

What is claimed is:

1. A circuit for reducing sheath current in an alternating current three phase line of a single core power cable in which anti-corrosive layers cover the outer surface of the metal sheath, comprising first normal joint box means in each of said phase lines; first wire means connecting the boxes in the respective lines and being grounded; each of said phase lines including first insulated joint box means having back and front contact points, said first insulated joint box means being serially connected via said back contact point to said first normal joint box means, a protective device connected in parallel via said back and front contact points with said first insulated joint box means, second insulated joint box means serially connected to said parallel combination via said front contact point; saturable reactor means coupled between the back contact point of one line with the front contact point of another line, respectively, each of said saturable reactor means reducing the current in said phase lines; each of said phase lines including second insulated joint box means having rear and forward contact points; second wire means connecting the rear contact of said second insulated joint box means of one line with the forward contact point of said second insulated joint box means of another line, respectively; each of said phase lines including second normal joint box means serially connected via said forward contact point to said second insulated joint box means; third wire means connecting the second normal joint box means in the respective lines and being grounded; each of said protective devices including a first set of parallel connected nonlinear resistance elements for operatively protecting one part of said first insulated joint box means, and being grounded through a discharging gap, and a second set of parallel connected nonlinear resistance elements for operatively protecting another part of said first insulated joint box means, and being grounded through a discharging gap, said protective devices operatively preventing the dielectric break-down in said anticorrosive layers and simultaneously the entering of surge voltages.

2. A circuit according to claim 1, in which said saturable reactor means has a pre-saturation impedance of 0.1 to 5.0 ohm and post-saturation impedance below 0.01 ohm.

3. A circuit according to claim 1, in which said saturable reactor means has the pre-saturation impedance of 0.2 to 0.5 ohm and post-saturation impedance below 0.001 ohm.

* * * * *